US012648666B2

(12) United States Patent
Salerno Binzoni

(10) Patent No.: US 12,648,666 B2
(45) Date of Patent: Jun. 9, 2026

(54) MACHINE FOR INHIBITING PATHOGENIC AGENTS DURING THE PREPARATION OF BEVERAGES BASED ON BREAST-MILK SUBSTITUTES

(71) Applicant: Cecilia Paola Salerno Binzoni, Barcelona (ES)

(72) Inventor: Cecilia Paola Salerno Binzoni, Barcelona (ES)

( * ) Notice: Subject to any disclaimer, the term of this patent is extended or adjusted under 35 U.S.C. 154(b) by 983 days.

(21) Appl. No.: 17/999,083

(22) PCT Filed: Jan. 31, 2020

(86) PCT No.: PCT/IB2020/050781
§ 371 (c)(1),
(2) Date: Nov. 17, 2022

(87) PCT Pub. No.: WO2021/152351
PCT Pub. Date: Aug. 5, 2021

(65) Prior Publication Data
US 2023/0190030 A1 Jun. 22, 2023

(51) Int. Cl.
*A47J 31/40* (2006.01)
*A47J 31/44* (2006.01)
(Continued)

(52) U.S. Cl.
CPC ........... *A47J 31/401* (2013.01); *A47J 31/404* (2013.01); *A47J 31/4407* (2013.01); *A47J 31/461* (2018.08); *A47J 31/5253* (2018.08)

(58) Field of Classification Search
CPC .... A47J 31/401; A47J 31/404; A47J 31/4407; A47J 31/461; A47J 31/5253; A47J 31/057; A47J 31/0605
See application file for complete search history.

(56) References Cited

U.S. PATENT DOCUMENTS

2019/0021540 A1 1/2019 Olson

FOREIGN PATENT DOCUMENTS

CN 110623543 A 12/2019

OTHER PUBLICATIONS

Search Report and Written Opinion of PCT?IB2020/050781 issued Oct. 13, 2020.

*Primary Examiner* — Elizabeth M Kerr
*Assistant Examiner* — Keith Brian Assante
(74) *Attorney, Agent, or Firm* — Silvia Salvadori, P.C.; Silvia Salvadori

(57) ABSTRACT

A machine (10) for inhibiting pathogenic agents during the preparation of beverages based on breast-milk substitutes and/or powdered products or the like is described, comprising: a water line starting from a water tank (3) and ending with at least one water outlet; at least one tank (1) for the powdered preparation, adapted to contain a powdered preparation or the like; said tank (1) being refillable; a compartment (4) adapted to at least partially accommodate said at least one tank (1); at least one hopper element (6) comprising a first inlet (12) adapted to receive the water coming out of said water tank (3) and the powdered preparation delivered by said at least one tank (1) for the powdered preparation and a delivery mouth (13) for delivering the water and preparation mixed, characterized in that: said at least one tank (1) for the powdered preparation can be removably inserted in said machine (10) for preparing a beverage; and in that said hopper element (6) can be coupled with and decoupled from the machine (10); said hopper element (6) comprising a closing element (17) operated to slide between a working position, wherein it does not allow to deliver the water and preparation mixed from said hopper element (6), and an open position, wherein the delivery of the water and preparation mixed from said hopper element (6) is allowed;

(Continued)

said closing element (17) being connected to a control unit configured to make said closing element (17) switch from the working position to the opening position once the inner temperature of the liquid inside the hopper element (6) has exceeded a first threshold value and has dropped back down below a second threshold value, said first threshold value being equal to 70°, said second threshold value being equal to 35°.

22 Claims, 8 Drawing Sheets

(51) Int. Cl.
    *A47J 31/46*        (2006.01)
    *A47J 31/52*        (2006.01)

MACHINE FOR INHIBITING PATHOGENIC AGENTS DURING THE PREPARATION OF BEVERAGES BASED ON BREAST-MILK SUBSTITUTES

FIELD OF THE INVENTION

Object of the present invention is a machine for inhibiting pathogenic agents during the preparation of beverages based on breast-milk substitutes and/or powdered products or the like.

In particular, object of the invention is a system comprising a machine for producing beverages, for example, but not exclusively, milked-based beverages for children, by adding powdered formulations to a liquid, preferably water, and such as to avoid the risk of bacterial contamination and to maintain asepsis.

STATE OF THE ART

As known, asepsis is a process aimed to prevent the contamination by microorganisms of previously sterilized substrates.

Automated machines or devices for producing beverages are known in the art.

Such known machines are configured to prepare beverages by adding appropriate quantities of powdered formulations at different temperatures.

In most of the known solutions, it is necessary to maintain storages of water and to use dosers and mixers.

The risks arising from using mixers in closed devices inside which it is difficult or impossible to see the possible permanence of product residues are mentioned in various health reports.

Known mixers can neither generally be cleaned nor removed.

According to what has been previously described, it is thus clear how the use of mixers involves a high risk of contamination and bacterial accumulation, thus making their inner hygiene critical.

Also whenever the devices provide automated washing systems, there is still a possibility that the walls of the mixer continue to host bacteria.

Thus, object of the present invention is to solve the aforesaid problems by means of a machine for preparing beverages which allows to create and maintain the asepsis while preparing beverages.

A further object of the present invention is to provide a machine that can ensure the inactivation of microorganisms during the preparation of breast-milk substitutes and/or powdered products or the like, that can be used to prevent or reduce the risk of infections in newborns, such as those produced by E sakazakii or other pathogenic agents.

A further object of the present invention is to easily and automatically allow to follow the specific and very rigorous regulations that allow to determine the ability to destroy pathogenic agents. By way of example, such regulations can be represented by: ISO 22964: 2006 Milk and milk products—Detection of *Enterobacter sakazakii* and Bacteriological analytical Manual, Chapter 29. Cronobacter. March 2012—Molecular biology techniques validated by the FDA.

A further object of the invention is to make a machine that can be disassembled easily, thus allowing the removal and complete washing of its component parts, in particular of those mainly in contact with the powdered preparations.

SUMMARY OF THE INVENTION

Thus, in a first aspect, the present invention concerns a machine for inhibiting pathogenic agents during the preparation of beverages based on breast-milk substitutes and/or powdered products or the like, comprising:

a water line starting from a water tank and ending with at least one water outlet;

at least one tank for the powdered preparation, adapted to contain a powdered preparation or the like; said tank being refillable;

a compartment adapted to at least partially accommodate said at least one tank;

at least one hopper element comprising at least one first inlet adapted to receive the water coming out of said water tank and/or the powdered preparation delivered by said at least one tank for the powdered preparation and a delivery mouth for delivering the water and preparation mixed;

characterized in that:

said at least one tank for the powdered preparation for beverages can be removably inserted in said machine for preparing a beverage; and in that said hopper element can be coupled with and decoupled from the machine;

said hopper element comprising a closing element operated to slide between a working position, wherein it does not allow to deliver the water and preparation mixed from said hopper element, and an open position, wherein the delivery of the water and preparation mixed from said hopper element is allowed;

said closing element being connected to a control unit configured to make said closing element switch from the working position to the opening position once the inner temperature of the liquid inside the hopper element has exceeded a first threshold value and has dropped back down below a second threshold value, said first threshold value being equal to 70°, said second threshold value being equal to 35°.

In the aforesaid aspect, the present invention can have at least one of the preferred characteristics described here below.

Conveniently, the hopper element has rotary blades configured for mixing the water and the powdered preparation, so that to ensure a high degree of mixing.

Preferably, the machine comprises at least one sensor for detecting the temperature of the fluid inside the hopper element, the sensor being connected with the control unit.

Advantageously, the hopper element comprises an upper lid comprising an opening configured to receive a predefined amount of powdered preparation for preparing the beverage coming from said at least one capsule.

Advantageously, the rotary blades are mounted concentrically outside of a portion of the closing element.

Preferably, the closing element comprises at least one upper portion and at least one lower portion, which are reciprocally sliding.

Conveniently, the machine comprises a first motor configured to rotate said blades inside said hopper element.

Advantageously, the rotation of the rotary blades in a first direction operates the reciprocal sliding of the upper and lower portions of the closing element; the rotation in a second direction, opposite the first direction, stops the reciprocal sliding of the upper and lower portions of said closing element, thus involving the integral rotation of the upper and lower portions of said closing element and of said rotary blades.

Preferably, the hopper element comprises guide elements for guiding the coupling of the hopper element in the machine.

Conveniently, the machine comprises at least one doser adapted to receive a given amount of said powdered preparation for beverages from at least one capsule and to deliver it in the hopper element.

Preferably, said at least one capsule comprises a housing compartment to house the doser and locking means to lock the doser inside the housing compartment.

Advantageously, the doser is removably mounted inside the housing compartment, so that to be removable with respect to said at least one capsule and to the machine.

Preferably, the doser is rotatably accommodated inside the compartment to rotate between an open position, wherein it allows the delivery of a predetermined amount of powdered preparation from said at least one capsule to the hopper element, and a closed position, wherein it prohibits the delivery of the amount of powdered preparation from at least one capsule to the hopper element.

Advantageously, said at least one capsule comprises at least two tanks for said powdered preparation, each tank being configured to contain at least 50 g of powdered preparation, preferably at least 70 g.

Preferably, each tank comprises an upper lid and an opening to make the powdered preparation flow out towards the doser.

Conveniently, the doser has a substantially discoid shape centrally provided with a seat for housing a rotary shaft extending inside the housing compartment.

Advantageously, the machine comprises at least one second motor for moving the doser between the first position and the second position and vice-versa.

Conveniently, the machine comprises at least one transmission member interposed between the second motor and the rotary shaft so that to transmit the motion to the rotary shaft to rotate the doser.

Preferably, the machine comprises at least one sensor for detecting the angular position of the doser.

Advantageously, the machine comprises a closing lid for closing the housing compartment of said at least one tank for the powdered preparation.

Conveniently, the machine comprises a frontal shielding element.

Preferably, the machine comprises at least one three-way valve for managing the water coming into the hopper element.

Conveniently, the water line provides a heating means for heating the water up to a temperature ranging between 70° C. and 90° C.

BRIEF DESCRIPTION OF THE DRAWINGS

Further characteristics and advantages of the invention will become clearer in the detailed description of some preferred, but not exclusive, embodiments of a machine for inhibiting pathogenic agents during the preparation of beverages based on breast-milk substitutes and/or powdered products or the like according to the present invention.

Such description will be exposed hereunder with reference to the accompanying drawings, only provided by way of example and thus not limiting, in which.

DETAILED DESCRIPTION OF EMBODIMENTS

Figure 1:
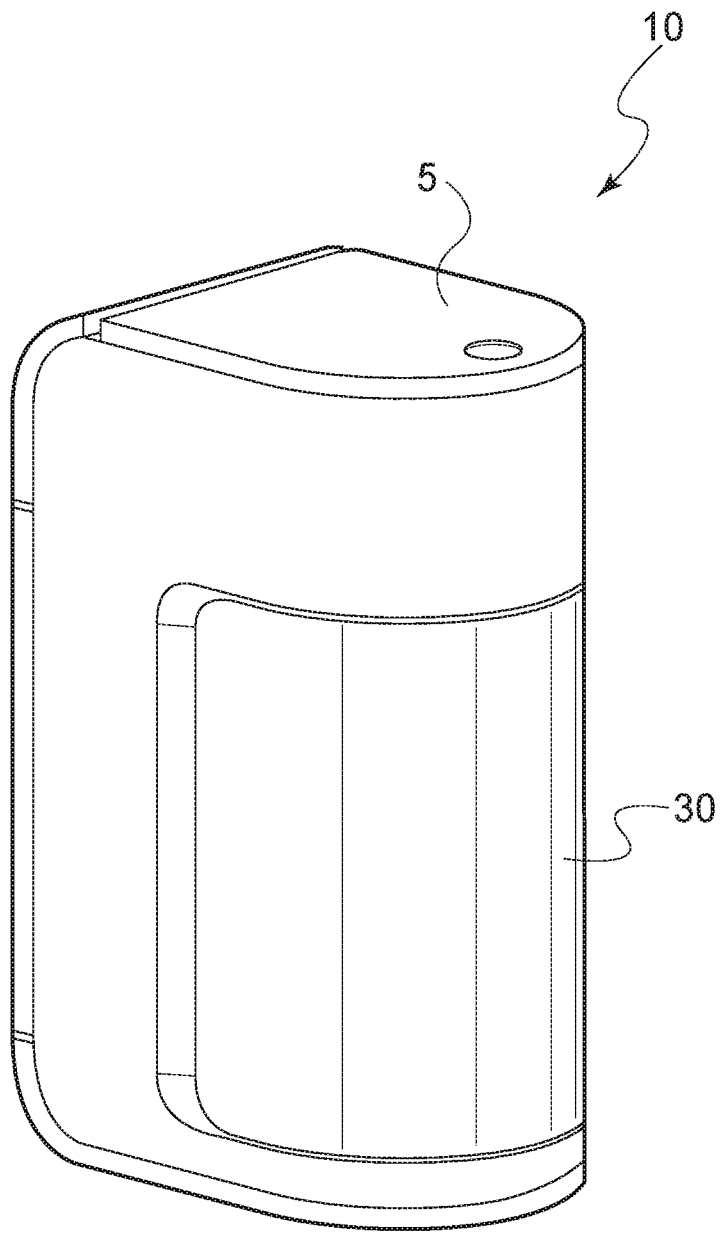
FIG. 1 shows a schematic perspective view of an example of a machine for preparing beverages based on breast-milk substitutes and/or powdered products or the like, according to the present invention.

With reference to the accompanying figures, 10 generally denotes a machine for preparing beverages based on breast-milk substitutes and/or powdered products or the like according to the present invention.

The machine 10 has, in its lower portion, a support 15 that can typically accommodate a baby bottle or a container for the beverage prepared as well as a water tank 3 (or for another liquid adapted for preparing the beverage).

Alternatively, the machine 10 may not have the support 15 but may be shaped to accommodate, in a cavity thereof, the baby bottle or container for the beverage prepared, in the latter case, the baby bottle could be positioned on the same plane bearing the machine 10, outside of the machine 10.

The machine 10 comprises a housing compartment 4 adapted for housing at least one tank 1 of the powdered preparation.

In the embodiment shown in the figures, the machine 10 preferably comprises a compartment 4 for housing a tank 1 of the powdered preparation.

In the embodiment shown in the FIG. 1, the housing compartment 4 is made in the upper portion of the machine 10 and has an upper lid 5 hinged to the upper portion of the machine 10. The lid 5 is configured to fully cover the housing compartment 4, thus not allowing access to the compartment itself unless removed.

The lid 5 is hinged at an end thereof to the upper portion of the machine 10 and provides elastic means, not shown in the figures, adapted to keep it closed on the housing compartment 4.

The raising of the lid 5 allows to access the tank 1 of the powdered preparation so that to remove it from the machine 10 in order to allow its washing or refilling.

In the embodiment shown in the figures, under the housing compartment 4, the machine 10 has a hopper element 6 configured to receive the powdered preparation and water so that to achieve the asepsis and the mixture. The hopper element 6 is substantially the place wherein the inactivation of pathogens occurs through the asepsis.

The hopper element 6 comprises a first inlet 12 arranged above and, adapted to receive the water coming out of the water outlet and/or the powdered preparation delivered by the tank 1 and a delivery mouth 13 for delivering the water and the preparation mixed into a baby bottle placed under the hopper element 6.

Generally, the hopper element 6 has a shape tapered in direction of the delivery mouth 13.

The machine 10 comprises a water tank 3. According to an embodiment shown in the figures, the capacity of the water tank 3 can be selected from 500 to 750 ml.

A water line, starting from the water tank 3 and reaching the hopper element 6 upstream, which in turn ends with the delivery mouth 13 facing the baby bottle, is provided in the machine 10.

Figure 2:
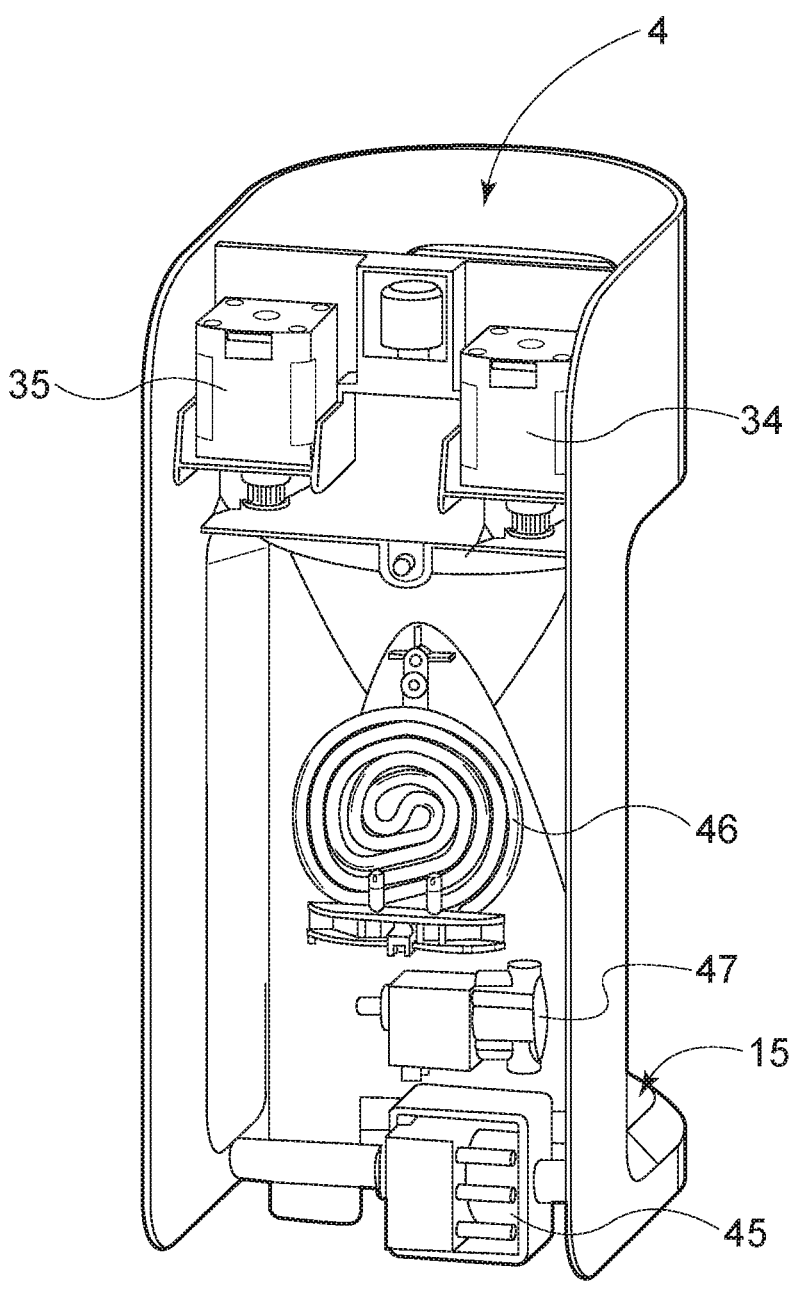
FIG. 2 is a schematic partial back view of the machine disassembled of FIG. 1.
Figure 3:
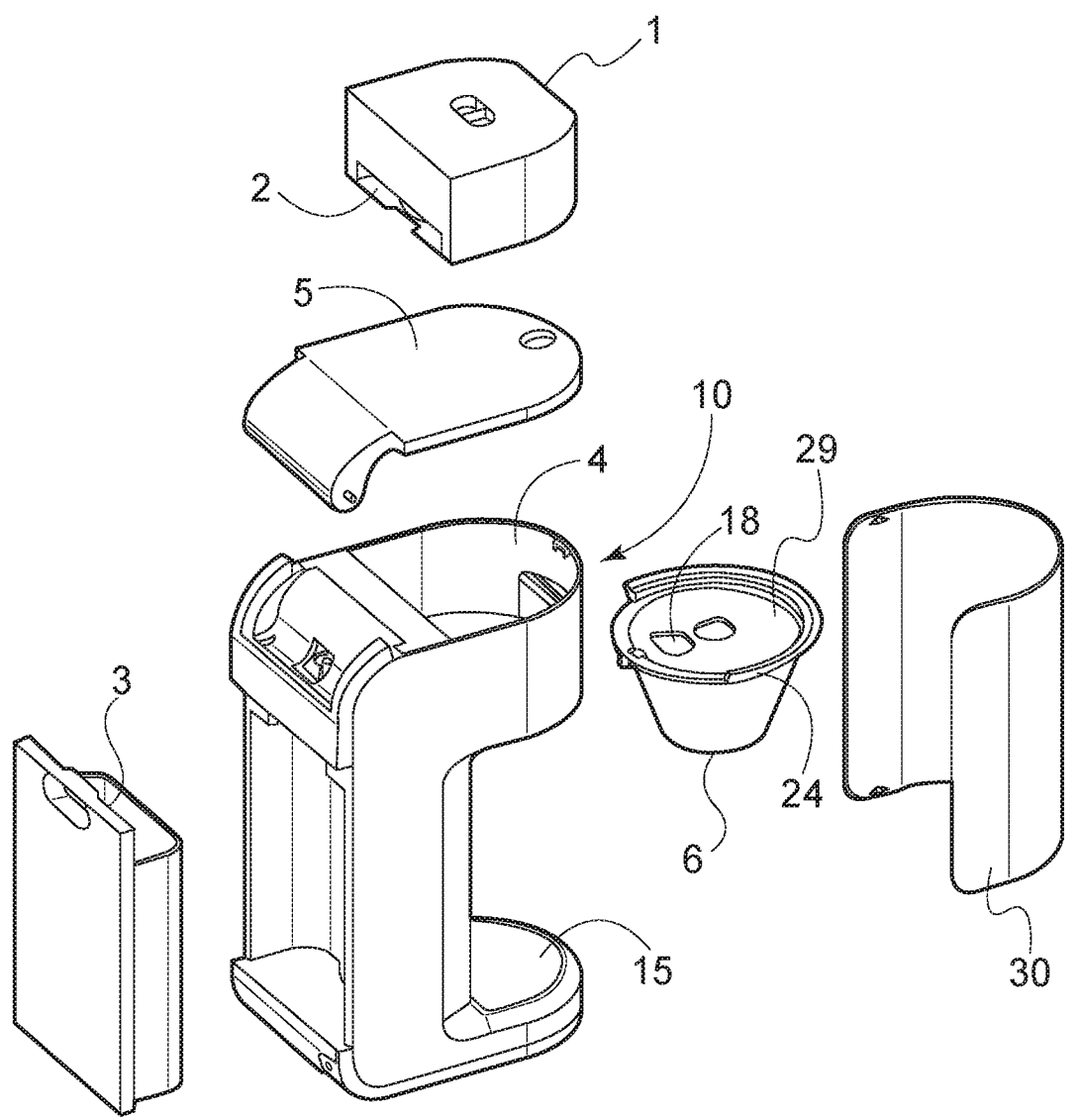
FIG. 3 is a schematic exploded view of the machine of FIG. 1.
Figure 4A:
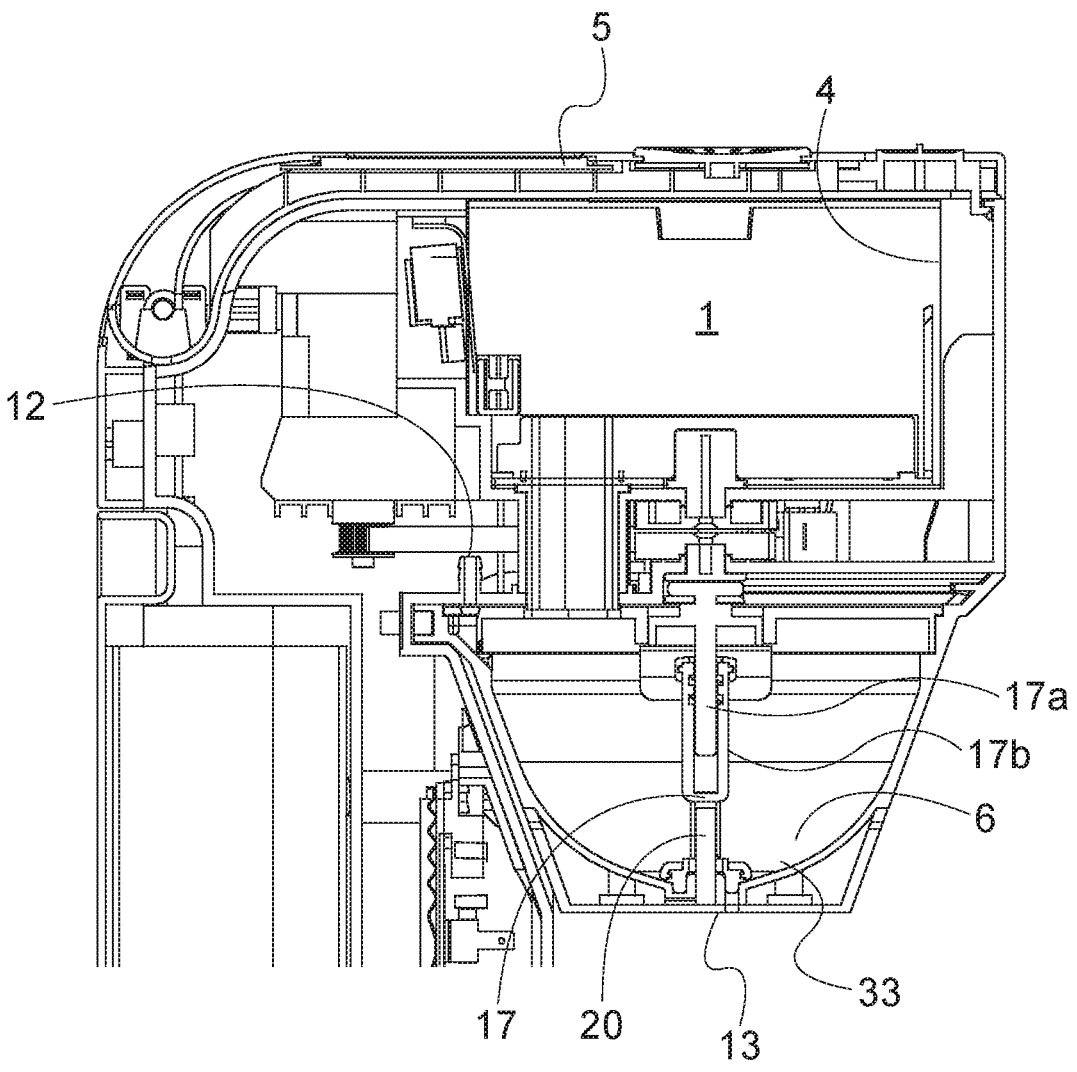
FIG. 4a is a schematic sectional side view of the upper portion of the machine of FIG. 1.
Figure 4B:
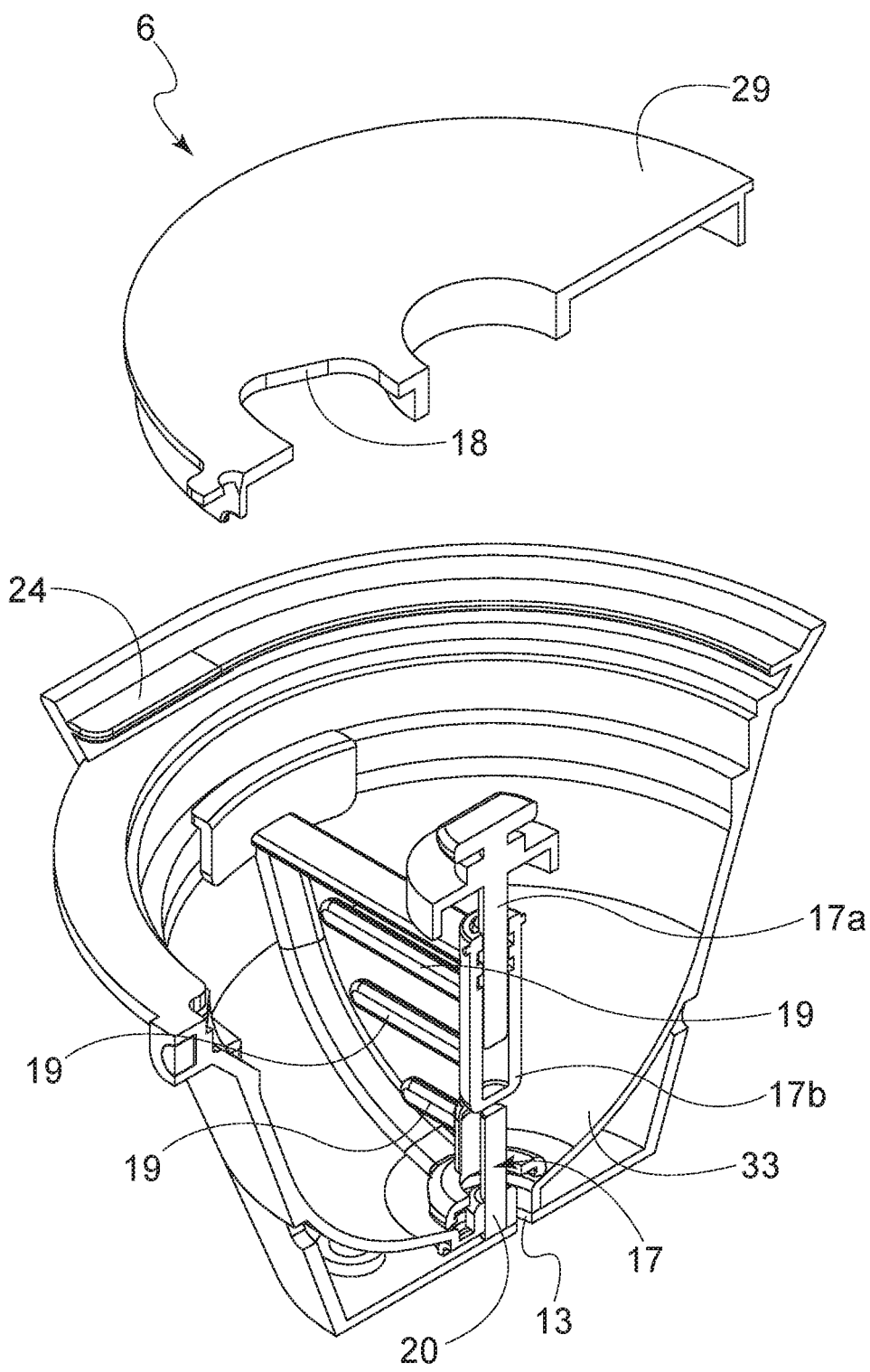
FIG. 4b is a schematic perspective view of the hopper element according to the present invention.

As better shown in FIG. 2, the water line has a delivery pump 45 and at least one electrovalve 47, preferably three-way.

There is a heating means 46 downstream of the electro-valve 47 for heating at least one portion of the water circulating inside the water line.

The water line can provide a second temperature sensor connected to the heating means 46 for measuring the temperature of the water delivered into the hopper element 6, the second temperature sensor is also in communication with the control unit and transmits the relevant data to the latter.

In the embodiment shown in the figures, the hopper element 6 can be supplied with water at different temperatures. Preferably, two flow rate ducts of the water coming out of the three-way electrovalve 47 can be present for this purpose.

In specific, a first duct passing directly from the electro-valve 47 to the hopper element 6 for bringing water, generally cold or at room temperature, coming out of the water tank 3 and a second duct extending between the electrovalve 47 and the hopper element 6 and passing through the heating means 46, so that to provide water at a given temperature.

The control unit manages the heating means 46, thanks to the information detected by the second temperature sensor, so that the delivered water is at a predetermined appropriate temperature.

Figure 5A:
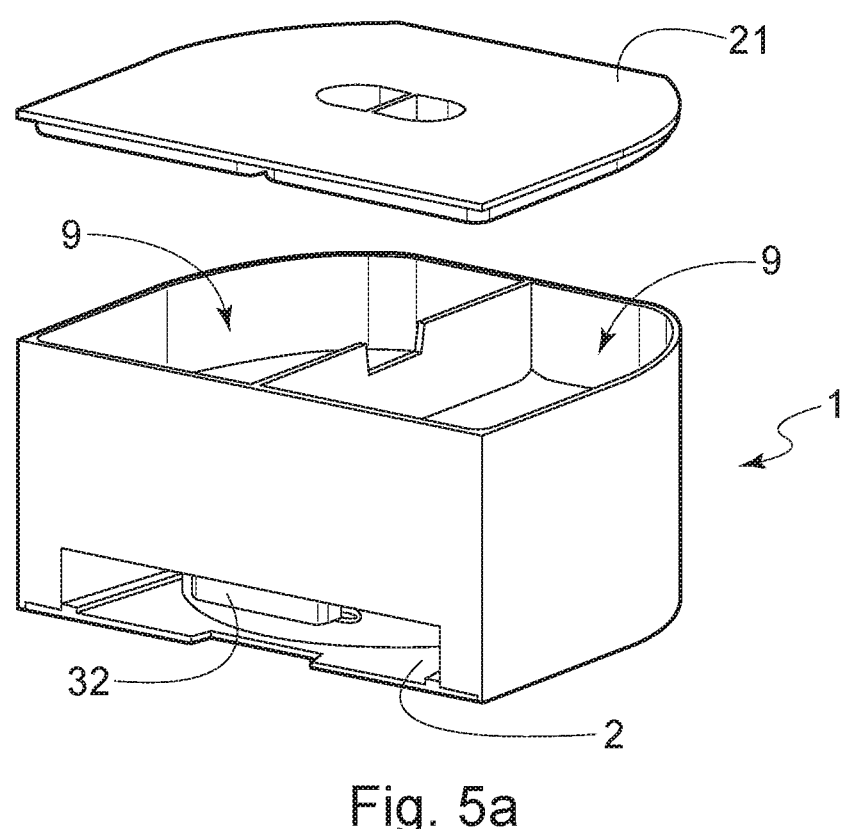
FIG. 5a is a schematic view of a tank for the powdered preparation according to the present invention.
Figure 5B:
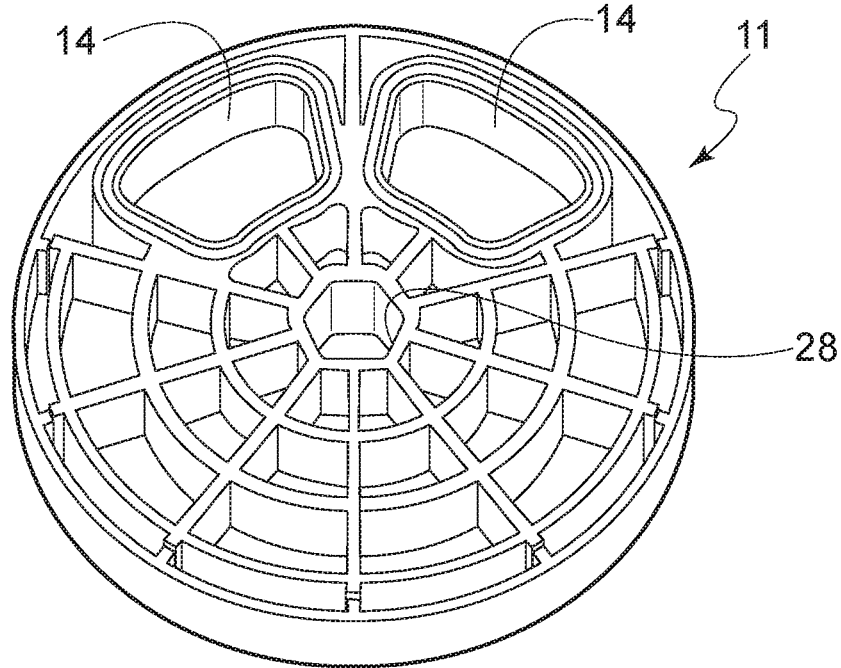
FIG. 5b is a schematic view of the doser according to the present invention.
Figure 5C:
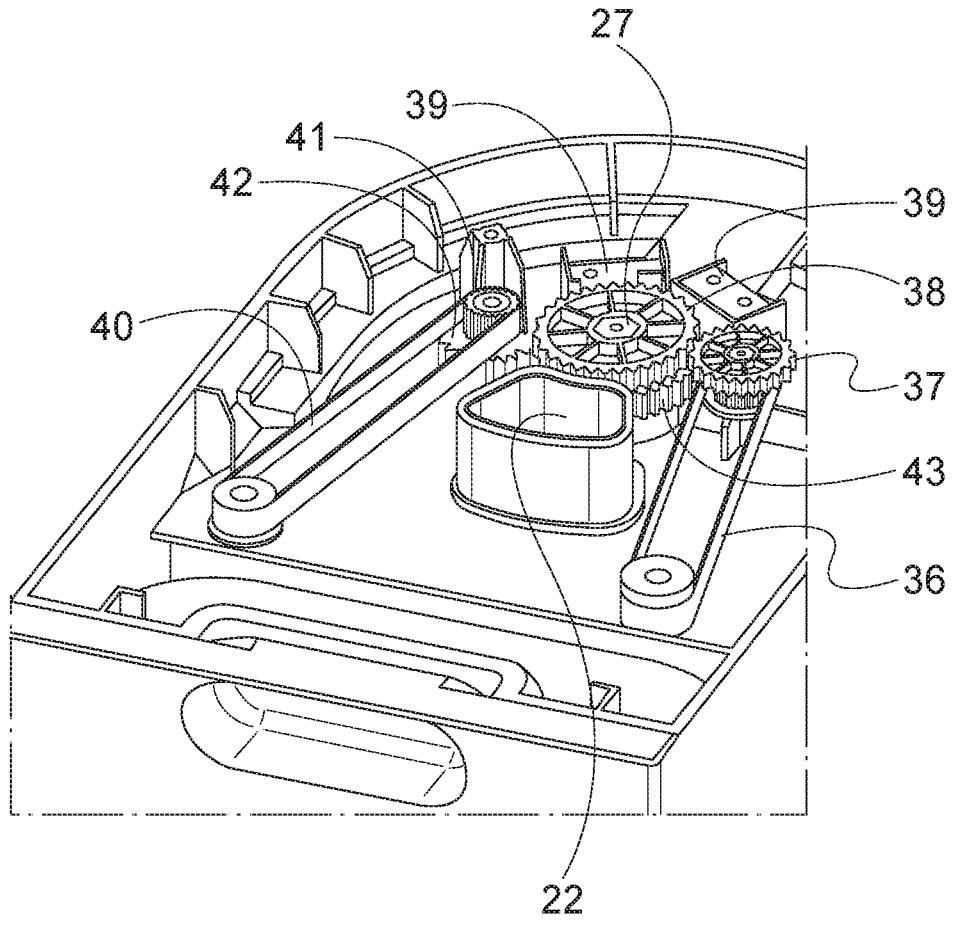
FIG. 5c is a schematic bottom view of a tank for the powdered preparation according to the present invention, with the transmission members for transmitting the motion of the doser highlighted.

The tank 1 for the powdered preparation, as better shown in FIGS. 5a-5c, consists of at least one compartment 9 for the powdered preparation and of one doser 11 adapted to receive a given amount of powdered preparation for beverages to transmit it to the hopper element 6 and consequently to deliver it, possibly mixed with the water, to the baby bottle or the underlying container.

In addition to receiving the water to be delivered from the tank 3, the hopper element 6 receives a predetermined amount of powdered preparation that will be mixed with the water being delivered.

In the machine 10, the powdered preparation is contained in the tank 1 for the powdered preparation. The tank 1 for the powdered preparation can be inserted into and taken out from the machine to allow its refilling and washing.

In particular, the tank 1 for the powdered preparation can be inserted in the appropriate housing compartment 4 provided above the machine 10.

In the embodiment shown in the figures, the tank 1 for the powdered preparation comprises at least two chambers 9 for the powdered preparation. In particular, a first chamber 9 is generally pre-arranged for receiving powdered milk, while the second chamber 9 is generally pre-arranged for containing powdered cereals or cookies.

Each chamber 9 is configured to contain at least 50 g of powdered preparation, preferably at least 70 g.

The two chambers 9 are of the same shape and size and are adjacent, but they could be of a different shape and capacity without however departing from the protection scope of the present invention. The chambers 9 comprise an upper lid 21 and an opening not directly shown in the figure and configured to make the powdered preparation flow out towards a doser 11, better described hereinafter.

In particular, in the embodiment shown in the figures, the chambers 9 are closed by a single upper lid 21 configured to simultaneously close both the chambers 9 for the powdered preparation.

The tank 1 for the powdered preparation comprises a housing compartment 2 for a doser 11 and means for locking the doser 11 inside the housing compartment 2.

The housing compartment 2 of the doser 11 is directly obtained under the chambers 9 for the powdered preparation, as shown in FIG. 5a. The tank 1 for the powdered preparation has a lower opening 22 for alternatively putting the chambers 9 in communication with the hopper element 6.

The housing compartment 2 fully contains the doser 11 which is removably inserted therein.

Suitable fastening means removably constrain the doser 11 inside the housing compartment 2 of the doser 11.

The fastening means 32 comprise an elastic element which operates a pin to keep the doser 11 inside its housing compartment 2.

By operating the pin, i.e. the displacement to a position in which it is not in interference with the doser 11, the latter can fully be removed from the machine 11 for its cleaning.

Different fastening means can be provided for keeping the doser 11 inside the housing compartment 2 without however departing from the protection scope of the present invention.

The doser 11 is like a cylindrical body and can be alternately put in communication, through an appropriate rotation thereof, with the chambers 9 provided above it.

For this purpose, the doser has an engagement hole 28 with a central rotary shaft 27, preferably a molded engagement hole 28.

In the embodiment shown in FIG. 5b, the engagement hole 28 has hexagonal shape and is sized to be engaged so that to be driven to rotate with a central rotary shaft 27 of hexagonal section.

Moreover, the doser 11 has two openings 14 for putting itself in communication with the chambers 9 of the powdered preparation so that to receive a given amount of powdered preparation, typically a dose or a multiple thereof, from the chambers 9 and to transfer it through the opening 22 to the hopper element 6.

The doser 11 receives the doses of powdered preparations from the chambers 9 to transmit them to a hopper element 6 placed vertically underneath it inside the machine. The mixing with the water and the inactivation of the pathogens will occur inside the hopper element 6.

By rotating, the doser 11 can switch from an angular position in which it receives the powdered preparation, typically powdered milk and/or cereals, from one chamber 9 at a time, to angular positions in which it does not receive the powdered preparation from the chambers 9, in other words, in the latter case, the passage of the powdered preparation from the chambers 9 to the doser 11 is prohibited.

The machine further comprises a second motor 35 configured to rotate the doser 11.

The motor shaft 35 is engaged with a transmission member, such as a belt 40, to transmit the rotary motion to the doser 11 through the cogwheels 41, 42.

The machine can further provide at least one sensor 39, preferably two, for detecting the angular position of the doser 11.

In the embodiment shown in the figures, the hopper element 6 is provided vertically underneath the doser 11 and in communication therewith.

The hopper element 6 is substantially the place wherein the inactivation of pathogens occurs.

The hopper element 6 comprises a first inlet 12 arranged above and adapted to receive the water coming out of the water line, a second inlet 18 for the powdered preparation delivered by the chambers 9 and a delivery mouth 13 for delivering the water and the powdered preparation mixed into a baby bottle placed under the hopper element 6.

Generally, the hopper element 6 has a shape tapered in direction of the delivery mouth 13.

The hopper element 6 can be coupled with and decoupled from the machine, so that to be removed and cleaned.

The hopper element 6 has a closing element 17, operated to slide between a working position (FIG. 6*a*), wherein it does not allow to deliver the water and the powdered preparation mixed into a baby bottle or container placed under it, and an opening position (FIG. 6*b*), wherein it is allowed to deliver the water and the preparation mixed, through the delivery mouth 13, into a baby bottle or container placed under it.

The closing element 17 consists of two parts reciprocally sliding between one another. In particular, as better shown in FIGS. 6*a*, 6*b*, the closing element 17 consists of an upper closing element 17*a* and a lower closing element 17*b*.

In the embodiment shown in the figures, the upper closing element 17*a* is screwed in an appropriate seat 32 of the upper closing element 17*b* so that the rotation of the upper closing element 17*b* in one direction makes one of the closing elements slide with respect to the other so that to raise the lower element 17*b* with respect to the inner bottom walls 33 of the hopper element 6, thus opening the access to the delivery mouth 13.

Figure 6A:
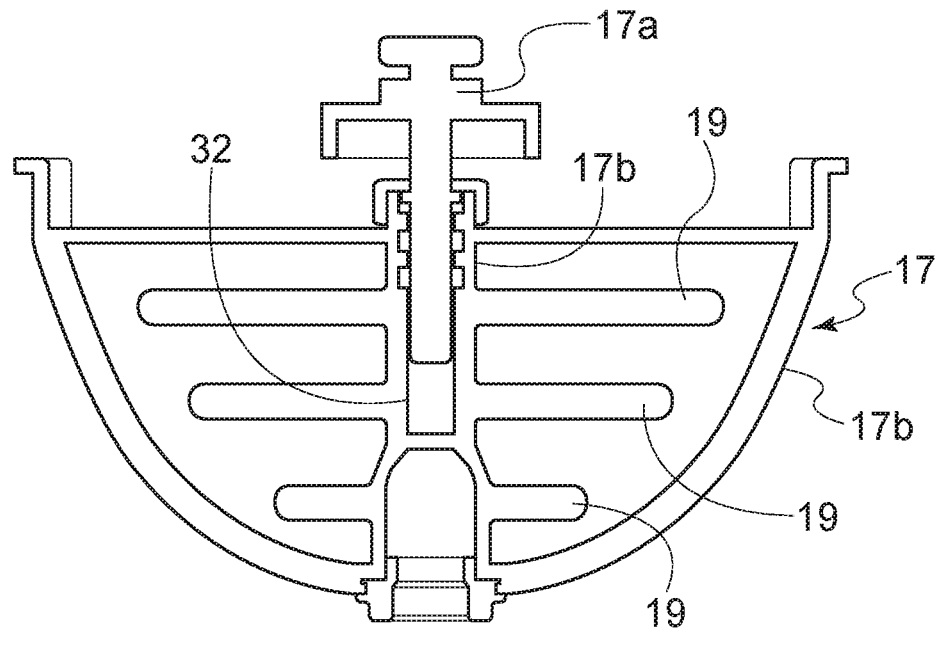
FIGS. 6a-6b are two views of the closing element of the hopper element respectively in a working and a closed configuration.
Figure 6B:
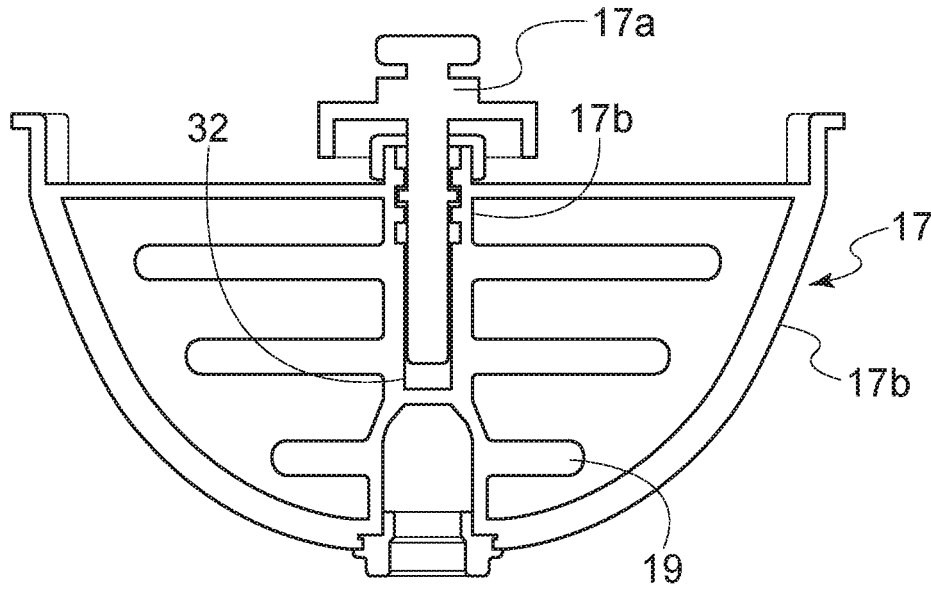

The lower closing element 17*b* is shown screwed onto the upper element 17*a* in FIG. 6*b*, in other words, by shortening the reciprocal distance between the lower 17*b* and the upper 17*a* closing elements, the first is raised with respect to the inner bottom walls 33 of the hopper element 6, thus opening the access to the delivery mouth 13.

On the contrary, the rotation of the upper closing element 17*a* in the opposite direction unscrews the lower closing element by lowering it and thus closing the access to the delivery mouth 13 for the mixture contained inside the hopper element 6.

The closing element 17 is connected to a control unit, not shown in the figure, configured to make the closing element 17 switch from the working position (FIG. 6*a*) to the open position (FIG. 6*b*).

The control unit drives the switch from the working position (FIG. 6*a*) to the open position (FIG. 6*b*) of the closing element 17 only once the asepsis or a process of inactivating the pathogenic agents in the mixture contained inside the hopper element 6 has occurred.

For this purpose, the control unit ensures that the temperature of the mixture was above a first threshold value for a given interval of time, typically a few minutes, and that the temperature of the mixture subsequently was brought under a second threshold value before allowing the delivery of the water and preparation mixture from the hopper element 6.

In order to ensure that the asepsis and the consequent deactivation of the pathogenic agents can occur, the first threshold value is of about 70°, preferably about 75°.

In order to allow the safe delivery without the risk of burning oneself, the second threshold value is instead of about 35°, preferably about 30°.

Thus, in detail, the control unit ensures that the temperature of the mixture was above about 75° C. for a given interval of time, typically of a few minutes, and that the temperature of the mixture subsequently has dropped back down under 30° C. before driving the closing element 17 to allow the delivery of the water and preparation mixture from the hopper element 6.

The hopper element comprises at least one first temperature sensor 20 for detecting the temperature of the mixture therein, the first temperature sensor 20 is connected to and communicates with the control unit.

In order to allow a better mixing of the powdered preparation with the hot water coming into the hopper element 6, the latter has rotary blades 19. In the embodiment shown in the figures, there are six rotary blades 19 divided into two groups of three rotary blades 19 each (FIGS. 6*a*, 6*b*). The rotary blades 19 of each group are arranged at different heights and have different radial extents. The rotary blades 19 of a group are arranged in a corresponding position, in other words at the same height of the rotary blades 19 of the remaining group.

The rotary blades 19 are mounted concentrically outside of the closing element 17. In particular, the rotary blades 19 are mounted concentrically outside of the lower closing element 17*b*.

The upper closing element 17*a* is thus mounted reciprocally sliding also with respect to the rotary blades 19.

The hopper element 6 further comprises an upper lid 29 provided with an opening 18 configured to receive a predefined amount of powdered preparation for preparing the beverage coming from the at least one chamber 9.

The machine further comprises a first motor 34 configured to rotate the blades inside the hopper element 6.

The motor shaft 34 is engaged with a transmission member, such as a belt 36, to transmit the rotary motion to the closing element 17 and consequently to the rotary blades 19 through the cogwheels 37, 38.

The present invention has been described with reference to some embodiments.

According to a further embodiment, the machine 10 can be used directly with the breast-milk by placing it inside the water tank 3 or in a chamber thereof, the temperature of the breast-milk is thus raised up to the first threshold value so that to ensure the inactivation of pathogens, while the raising of the closing element 17 and the consequent delivery of the breast-milk is driven by the dropping back down of the temperature of the breast-milk inside the hopper element 6 under the second threshold value (30-40° C.).

Several changes can be made to the embodiments described in detail, anyhow remaining within the protection scope of the invention, defined by the following claims.

The invention claimed is:

1. Machine (10) for inhibiting pathogenic agents during the preparation of beverages based on breast-milk substitutes and/or powdered products or the like, comprising:

a water line starting from a water tank (3) and ending with at least one water outlet;

at least one tank (1) for the powdered preparation, adapted to contain a powdered preparation or the like; said tank (1) being refillable;

a compartment (4) adapted to at least partially accommodate said at least one tank (1);

at least one hopper element (6) comprising at least one first inlet (12) adapted to receive the water coming out of said water tank (3) and/or the powdered preparation delivered by said at least one tank (1) for the powdered preparation and a delivery mouth (13) for delivering the water and preparation mixed, wherein said at least one tank (1) for the powdered preparation can be removably inserted in said machine (10) for preparing a beverage; and in that said hopper element (6) can be coupled with and decoupled from the machine (10);

said hopper element (6) comprising a closing element (17) operated to slide between a working position, wherein it does not allow to deliver the water and preparation mixed from said hopper element (6), and an open position, wherein the delivery of the water and preparation mixed from said hopper element (6) is allowed; said closing element (17) being connected to a control unit configured to make said closing element (17) switch from the working position to the opening position once the inner temperature of the liquid inside the hopper element (6) has exceeded a first threshold value and has dropped back down below a second threshold value, said first threshold value being equal to 70°, said second threshold value being equal to 35°.

2. Machine (10) according to claim 1, wherein said hopper element (6) comprises rotary blades (19) for mixing the water and the powdered preparation.

3. Machine (10) according to claim 1, wherein the machine (10) comprises at least one first sensor (20) for detecting the temperature of the fluid inside said hopper element (6), said at least one first sensor (20) being connected to said control unit.

4. Machine (10) according to claim 1, wherein said hopper element (6) comprises an upper lid (29) comprising an opening (18) configured to receive a predefined amount of powdered preparation for preparing the beverage coming from said at least one tank (1) for the powdered preparation.

5. Machine (10) according to claim 2, wherein said rotary blades (19) are mounted concentrically outside of a portion of said closing element (17).

6. Machine (10) according to claim 1, wherein said closing element (17) comprises at least one upper portion (17*a*) and at least one lower portion (17*b*), which are reciprocally sliding.

7. Machine according to claim 2, wherein said machine (10) comprises a first motor (34) configured to rotate said rotary blades (19) inside said hopper element (6).

8. Machine according to claim 7, wherein the rotation of the rotary blades (19) in a first direction operates the reciprocal sliding of the upper (17*a*) and lower (17*b*) portions of the closing element (17); the rotation in a second direction, opposite the first direction, stops the reciprocal sliding of the upper (17*a*) and lower (17*b*) portions of said closing element (17), thus involving the integral rotation of the upper (17*a*) and lower (17*b*) portions of said closing element (17) and of said rotary blades (19).

9. Machine (10) according to claim 1, wherein said hopper element (6) comprises guide elements (24) for guiding the coupling of the hopper element (6) in the machine (10).

10. Machine (10) according to claim 1, wherein said machine (10) comprises at least one doser (11) adapted to receive a given amount of said powdered preparation for beverages from said at least one tank (1) and to deliver it into said hopper element (6).

11. Machine (10) according to claim 10, wherein said at least one tank (1) for the powdered preparation comprises a housing compartment (44) to house said doser (11) and locking means to lock said doser (11) inside said housing compartment (2).

12. Machine (10) according to claim 11, wherein said doser (11) is removably mounted inside said housing compartment (2), so that to be removable with respect to said at least one tank (1) for the powdered preparation and to said machine (10).

13. Machine (10) according to claim 11, wherein said doser (11) is rotatably accommodated inside said housing compartment (44) for rotating between an open position, wherein it allows the delivery of a predetermined amount of powdered preparation from said at least one tank (1) to said hopper element (6), and a closed position, wherein it prohibits the delivery of the amount of powdered preparation from said at least one tank (1) to said hopper element (6).

14. Machine (10) according to claim 1, wherein said at least one tank (1) comprises at least two chambers (9) for said powdered preparation, each chamber (9) being configured to contain at least 50 g of powdered preparation, preferably at least 70 g.

15. Machine (10) according to claim 14, wherein the chambers (9) comprise an upper lid (21) and an opening to make the powdered preparation flow out towards said doser (11).

16. Machine (10) according to claim 10, wherein said doser (11) has a substantially cylindrical shape centrally provided with a seat (28) for housing a rotary shaft (27) extending inside the housing compartment (2).

17. Machine (10) according to claim 10, wherein said machine (10) comprises at least one second motor (35) for moving said doser (11) between said first position and said second position and vice-versa.

18. Machine according to claim 17, wherein said machine (10) comprises at least one transmission member (40, 41, 42) functionally interposed between said second motor (35) and said rotary shaft (27) so that to transmit the motion to the rotary shaft (27) so that to rotate said doser (11).

19. Machine according to claim 10, wherein said machine comprises at least one sensor for detecting the angular position of said doser (11).

20. Machine according to claim 1, wherein said machine (10) comprises a closing lid (5) for closing the housing compartment (4) of said at least one tank (1) for the powdered preparation.

21. Machine according to claim 1, wherein said machine (10) comprises a frontal shielding element (30).

22. Machine according to claim 1, wherein said machine (10) comprises at least one three-way valve (47) for managing the water coming into said hopper element (6).

\* \* \* \* \*